United States Patent
Nishiki et al.

(10) Patent No.: US 6,869,714 B2
(45) Date of Patent: Mar. 22, 2005

(54) ELECTRODE-MEMBRANE ASSEMBLY AND PROCESS FOR THE PREPARATION THEREOF

(75) Inventors: Yoshinori Nishiki, Fujisawa (JP); Takayuki Shimamune, Machida (JP); Tsuneto Furuta, Fujisawa (JP); Kyoji Kimoto, Yokohama (JP)

(73) Assignee: Permelec Electrode Ltd., Kanagawa (JP)

( * ) Notice: Subject to any disclaimer, the term of this patent is extended or adjusted under 35 U.S.C. 154(b) by 410 days.

(21) Appl. No.: 10/062,442

(22) Filed: Feb. 5, 2002

(65) Prior Publication Data

US 2002/0106550 A1 Aug. 8, 2002

(30) Foreign Application Priority Data

Feb. 6, 2001 (JP) .................................. P.2001-029473

(51) Int. Cl.$^7$ ................... H01M 4/86; H01M 8/10; H01M 4/88
(52) U.S. Cl. .................. 429/33; 429/41; 29/623.5; 204/252; 204/278.5
(58) Field of Search .............. 204/252, 278.5; 29/623.5; 429/33, 41

(56) References Cited

U.S. PATENT DOCUMENTS

| | | | | |
|---|---|---|---|---|
| 5,723,231 A | * | 3/1998 | Wu et al. | 429/203 |
| 5,772,934 A | * | 6/1998 | MacFadden | 264/42 |
| 5,906,716 A | * | 5/1999 | Mertesdorf et al. | 204/296 |

* cited by examiner

Primary Examiner—John S. Maples
(74) Attorney, Agent, or Firm—Sughrue Mion, PLLC

(57) ABSTRACT

An electrode-membrane assembly comprising a pair of electrodes at least one of which is porous, and a thermoplastic resin membrane having a functional group capable of being modified to a free ion exchange group upon hydrolysis, which is interposed between the two electrodes and partly penetrates into the pores of the electrode. In this arrangement, the ion exchange membrane can be mechanically integrated to the anode and cathode to compensate for the insufficiency of mechanical strength of the ion exchange membrane. Thus, an electrode-membrane assembly which can be used in an industrial electrolytic cell or fuel cell is provided.

8 Claims, 1 Drawing Sheet

ELECTRODE-MEMBRANE ASSEMBLY AND PROCESS FOR THE PREPARATION THEREOF

FIELD OF THE INVENTION

The present invention relates to an electrode-membrane assembly which can be used in electrochemical devices such as fuel cell and industrial electrolytic cell and more particularly to an electrode-thermoplastic resin membrane assembly or electrode-ion exchange membrane assembly.

BACKGROUND OF THE INVENTION

An electrochemical process is a physical process enabling the conversion between electrical energy and chemical energy. Various applied electrochemical processes have been studied as clean and high efficiency industrial process or power generating system. These processes have been used on an industrial basis.

For these electrochemical processes, a liquid electrolyte having an ionically-conductive supporting electrolyte dissolved therein has been used. In recent years, the development of an electrochemical device utilizing a solid electrolyte has been under way. Unlike the liquid electrolyte, such a polymer solid electrolyte is advantageous in that it allows easy separation of a water-soluble electrolysis product and enhancement of the purity of gaseous product, needs only to control the supply of water in the case of electrolysis of water, eliminating the necessity of controlling the electrolyte concentration, and allows the use of a safe and simple electrolytic cell structure.

For example, in the electrolysis of salt, which is employed on a large scale in the art of industrial electrolysis, mercury process or asbestos process, which had heretofore been used, has been replaced by a process using an ion exchange membrane made of a fluororesin, which is a polymer solid electrolyte.

Further, in the art of lithium battery, a polymer solid electrolyte having a fluorine-containing electrolyte retained on a resin as a matrix has been developed. Moreover, in the art of a fuel cell using hydrogen and oxygen as starting material, the public interest has been switched from the alkaline solution type or phosphoric acid type cell, which is a conventional type, to a polymer solid electrolyte type fuel cell (PEFC). As compared with the conventional types of cell, this polymer solid electrolyte type fuel cell is simple and can provide a large output density and thus has become an important target of development as a clean power supply for automobile, local power generator, etc.

These electrochemical devices often comprise as the material of polymer solid electrolyte a resin composed of a fluororesin skeleton having a sulfonic acid group as an exchange group, though being expensive, to have a high durability which could not be obtained with hydrocarbon-based resins.

The polymer solid electrolyte to be used in the above-described cells and electrolytic cells must meet essential requirements for high ionic conductivity and capability of separating reactant and product as well as low electrical resistivity from the standpoint of energy efficiency. In particular, in the case these devices are operated at a high current density, the electrical resistivity is an important factor that may disable the electrochemical process if it is too high.

In order to reduce voltage loss due to the electrical resistivity of the polymer solid electrolyte, it has been practiced to reduce the thickness of the polymer solid electrolyte formed in a sheet. The thickness of a perfluorocarbon sulfonic acid-based polymer solid electrolyte membrane, which has heretofore been about 200 $\mu$m, is now reduced to a range of from about 25 to 50 $\mu$m.

By thus reducing the thickness of the polymer solid electrolyte sheet, the loss due to resistivity can be reduced. On the other hand, however, the physical strength of the polymer solid electrolyte membrane itself is reduced, making it difficult for the polymer solid electrolyte membrane to handle. In particular, the polymer solid electrolyte type fuel cell, which has recently been noted, is best required to produce a raised power voltage for the purpose of raising the energy efficiency. An ordinary membrane-electrode-membrane electrode (MEA: Membrane Electrode Assembly) is required to have a strength high enough to form an electrode on the surface of the polymer solid electrolyte. To this end, the strength of the membrane is secured at the sacrifice of electrical resistivity. As previously mentioned, a low electrical resistivity polymer solid electrolyte membrane having a thickness of 25 $\mu$m has been developed. Nevertheless, it is the status of quo that the thickness of the membrane is raised, although being aware of the increase of electrical resistivity, and reinforced by a reinforcing material to enhance the mechanical strength thereof or a polymer solid electrolyte membrane (ion exchange membrane) reinforced by a reinforcing material is originally produced. A material having a sufficiently small thickness and a high strength has been developed as a reinforcing material and can be used for polymer solid electrolyte membrane. However, since the reinforced part of the membrane does not pass electric current, the resulting membrane is still unavoidably subject to the increase of loss due to resistivity.

The reduction of the electrical resistivity of the membrane can be attained by the increase of the ion exchange capacity of the membrane besides by the reduction of the thickness of the membrane. However, when the ion exchange capacity of the membrane is raised, the resulting membrane normally exhibits deteriorated film-forming properties, making it impossible to obtain a sufficient membrane strength. Accordingly, the ion exchange capacity of the membrane cannot be raised excessively.

For these reasons, the practical use of polymer solid electrolyte membrane has been prevented by the deterioration of mechanical strength although a polymer solid electrolyte membrane having a sufficiently low electrical resistivity has been available.

On the other hand, when the connection between the membrane and the electrode is insufficient, local concentration of electric current can easily occur, making it difficult to obtain a good cell performance. In order to overcome these difficulties, Japanese Patent Laid-Open No. 1994-251782 and Japanese Patent Laid-Open No. 1996-329962 disclose a process for the preparation of an assembly of a perfluorocation exchange membrane and a fuel cell electrode and an assembly of an electrode having an electrode catalyst and an electrolyte incorporated in a porous PTEFE and an electrolyte, respectively. Japanese Patent Laid-Open No. 1998-284087, Japanese Patent Laid-Open No. 1998-334923 and Japanese Patent Laid-Open No. 1999-288727 disclose a process which comprises obtaining an assembly of electrode catalyst layers containing a proton-conductive polymer having different ion exchange capacities to provide a fuel cell having an enhanced performance Further, Japanese Patent Laid-Open No.1999-135136 and Japanese Patent Laid-Open No. 1999-339824 disclose a process for the preparation of an assembly of an ion exchange membrane having a phosphonic acid group and an electrode. Moreover, WO 00/63991 discloses a process for the synthesis of a novel ion exchange membrane having a phosphonic acid group and hence a reduced resistivity.

These improvements provide a great enhancement of cell performance and electrolytic properties. However, these improvements are disadvantageous in that the resulting assembly has no sufficient strength and the membrane components employable are limited, thus providing only a polymer solid electrolyte membrane having a low resistivity but deteriorated film-forming properties.

SUMMARY OF THE INVENTION

Accordingly, one object of the invention to provide an electrode-membrane assembly which exhibits a sufficient strength and a low resistivity as a whole even when made of a material having an insufficient physical strength.

Another object of the invention is to provide a process for the preparation the assembly.

The above objects of the invention will become apparent from the following detailed description and examples.

The invention provides an electrode-membrane assembly comprising a pair of electrodes at least one of which is porous, and a thermoplastic resin membrane having a functional group capable of being modified to a free ion exchange group upon hydrolysis, which is interposed between the two electrodes and partly penetrates into the pores of the electrode.

The invention also provides an electrode-membrane assembly obtained by subjecting the thermoplastic resin membrane having a functional group to hydrolysis so that it is modified to an ion exchange membrane having a free ion exchange group.

The invention further provides a process for the preparation of an electrode-membrane assembly which comprises disposing a thermoplastic resin membrane having a functional group capable of being modified to a free ion exchange group upon hydrolysis between a pair of electrodes at least one of which is porous, applying an external force to the assembly so that the thermoplastic resin membrane is deformed and partly allowed to penetrate into the pores of the porous electrode to make integration, and then subjecting the assembly to hydrolysis so that the functional group is released and modified to a free ion exchange group.

The electrode-membrane assembly of the invention can be used as a fuel cell or zero-gap type electrolytic cell to advantage. The filmy polymer having a functional group which acts as a precursor of membrane will be hereinafter referred to as "thermoplastic resin membrane" and the polymer having a free ion exchange group will be hereinafter referred to as "filmy ion exchange membrane" unless otherwise specified.

BRIEF DESCRIPTION OF THE DRAWINGS

By way of example and to make the description more clear, reference is made to the accompanying drawings in which.

DETAILED DESCRIPTION OF THE INVENTION

Figure 1:
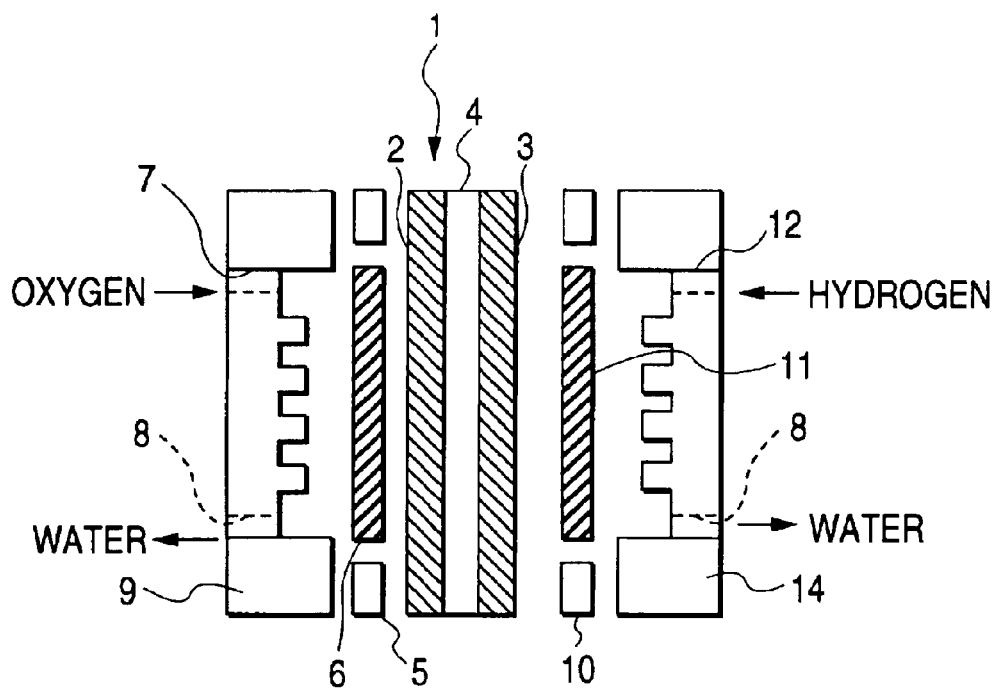
FIG. 1 is an exploded front view illustrating an embodiment of the fuel cell having an electrode-membrane assembly of the invention incorporated therein.

The invention will be described in detail below.

The electrode-membrane assembly of the invention can be used in a PFEC fuel cell comprising a hydrogen negative electrode (anode) containing a hydrocarbon material such as methanol and an oxygen positive electrode (cathode) or a zero-gap type electrolytic cell comprising an anode for industrial electrolysis, oxygen generation or ozone generation using a gas electrode and a hydrogen generation cathode to advantage in particular.

The invention provides a final electrode-membrane assembly having a satisfactory level of mechanical strength even when a material having relatively poor film-forming properties. The term "film-forming properties" as used herein means to indicate the capability of a sheet-like membrane formed from a membrane material of retaining its forming shape by itself.

A film prepared from a material having a low degree of polymerization or a high ion exchange capacity exhibits a low resistivity and hence a low voltage loss. Accordingly, when such a film is used as an electrode separating membrane for fuel cell, the resulting fuel cell can give electric current at a high efficiency. In the case where the same material is used, the smaller the thickness of the film is, the lower is the resistivity of the film and hence the greater is the efficiency in the withdrawal of current.

However, any films prepared from such a low electrical resistivity material exhibit a deteriorated mechanical strength and hence deteriorated film-forming properties. In other words, in general, the better the film-forming properties of the film are, the higher is the electrical resistivity of the film. The lower the electrical resistivity of the film is, the worse are the film-forming properties of the film. Accordingly, no films having good film-forming properties and a low electrical resistivity have heretofore actually existed.

The invention gives solution to the above disadvantages of the related art. The invention provides an electrode-membrane assembly which can meet both the requirements for good film-forming properties and low electrical resistivity, which have heretofore been conflicting.

In some detail, a thermoplastic resin membrane which is an ion exchange membrane formed from a material having a deteriorated material or a precursor of such an ion exchange membrane is interposed between a pair of electrodes at least one of which is porous. A material having deteriorated film-forming properties, e.g., thermoplastic resin having a high ion exchange membrane is elastic. Therefore, when interposed between a pair of electrodes, the thermoplastic resin partly penetrates into the pores of the porous electrode or partly pressed into these pores. In this arrangement, the thermoplastic resin is retained by and integrated to the electrode. Even if the thermoplastic resin itself has deteriorated film-forming properties, it can be retained by and integrated to the electrode to form an integrated electrode-membrane assembly. This electrode-membrane assembly has an enhanced mechanical strength and thus causes no troubles due to the insufficiency of film-forming properties when used as an ion exchange membrane in fuel cell or electrolytic cell. Further, a material having poor film-forming properties has a low electrical resistivity and thus has little voltage loss, enabling electrolytic reaction or power generation at a high efficiency. Thus, the invention allows the use of a polymer solid electrolyte which has heretofore not been usable because of its poor film-forming properties despite its low electrical resistivity.

Moreover, a thermoplastic resin having a functional group which can be modified to sulfonic acid group, phosphonic acid group, carboxylic acid group or the like normally exhibits a high elasticity and thus can be easily mechanically deformed and worked to show an excellent stretchability and flexibility but exhibits a deteriorated stretchability and thus can be difficultly deformed if it has a free ion exchange group.

In general, a polymer solid electrolyte is formed into a film which is then mounted in an electrolytic cell. In order to form an electrolyte material into a film, it is necessary that the electrolyte material have some degree of polymerization. As such a material there is known, e.g., Nafion (produced by Du Pont). A material having a low degree of polymerization exhibits an excellent conductivity but can difficultly be worked and thus is not used normally.

In order to use a material (polymer solid electrolyte) having a low degree of polymerization in an electrode-membrane assembly in a stable manner, the thermoplastic resin having a functional group is allowed to penetrate into the porous electrode or pressed into these pores as a precursor thermoplastic resin to make an integrated electrode-membrane assembly rather than being previously formed into the final film form, and then subjected to hydrolysis so that the functional group is released to convert the resin to a free ion exchange group. In this manner, the thermoplastic resin penetrates or pressed into the porous electrode to form a stabilized assembly. Further, even when the functional group is subsequently modified to an ion exchange membrane, the electrode-membrane assembly can be provided with a sufficient mechanical strength.

In the invention, it is preferred that a thermoplastic resin which can be modified to a sulfonic acid group, phosphonic acid group, carboxylic acid group or the like be used as a material. The use of such a thermoplastic resin makes it possible to make the use of the elasticity of the thermoplastic resin, allowing the thermoplastic resin to partly penetrate into or be pressed into the pores of the electrode more easily. When the thermoplastic resin is subsequently modified to an ion exchange membrane having a free ion exchange group, the thermoplastic resin which has penetrated or been pressed into the pores becomes hardened to make the connection between the electrode and the membrane more firm.

As can be seen in the above description, the thermoplastic resin or ion exchange membrane to be used in the invention exerts its effect most remarkably when it has deteriorated film-forming properties. As the ion exchange membrane or thermoplastic resin there is preferably used a perfluorocarbon polymer which is a fluorine-containing ion exchange resin having a free sulfonic acid group or a perfluorocarbon polymer having a protected functional group which is a precursor thereof. A preferred example of the thermoplastic resin is a copolymer of tetrafluoroethylene (TFE) and a fluorovinyl compound which is a precursor of a fluorine-containing ion exchange resin having a sulfonic acid group.

The membrane thus modified shows remarkably different physical properties with the proportion of TFE monomer and fluorovinyl monomer having a precursor in the polymer component and the kind of these monomers. A membrane having an ion exchange capacity of not smaller than 1.2 to 1.5 milliequivalents/dried resin has been empirically obtained. However, such a film has no sufficient mechanical strength and thus can be difficultly formed by itself and cannot be used. Therefore, commercially available membranes exhibit an ion exchange capacity of not greater than 1 milliequivalent/dried resin and shows an increase of electrical resistivity with the capacity drop to disadvantage. Another preferred example of the thermoplastic resin which has recently appeared is a copolymer of TFE and a fluorovinyl compound which is a precursor of a fluorine-containing ion exchange resin having a phosphonic acid group. However, the thermoplastic resin or ion exchange membrane to be used in the assembly of the invention is not limited to these compounds.

A specific example of the fluorovinyl compound is $CF_2=CF-(OCF_2CFX)m-Op-(CF_2)n-A$ in which n represents an integer of 2 or 3, p represents an integer of 1, m represents an integer of 0 or 1, X represents $CF_3$, and A represents $-SO_2F$ (sulfonyl fluoride) or $-PO(OR)_2$ (in which R represents a $C_1-C_{10}$ alkyl or allyl group).

When the copolymerization reaction is effected in an aqueous system, the air in an autoclave is replaced by TFE gas atmosphere. In this autoclave, a perfluoroammonium salt and a pH buffer are dissolved in purified water. To the solution is then added a radical reaction initiator. A monomer having a functional group is then dissolved in the solution. The reaction solution is then allowed to undergo polymerization reaction at a temperature of from 30° C. to 60° C. under pressure while TFE gas is injected thereinto. When the copolymerization reaction is effected in a nonaqueous system, a monomer having a functional group is dissolved in 1,1,2-trichloro-1,2,2-trifluoroethane or the like as a diluent. To the solution is then added a radical reaction initiator. The reaction solution is then allowed to undergo polymerization reaction at a temperature of from 30° C. to 60° C. under pressure while TFE gas is being injected thereinto. The formulation of the polymer can be adjusted by the amount of diluent in the monomer solution, the temperature and the RFE gas pressure. The rate of TFE polymerization reaction is greater than that of a monomer having a functional group such as perfluorovinyl ether $CF_2=CF-(OCF_2CFCF_3)-O-(CF_2)_2-SO_2F$. Therefore, by reducing TFE pressure or increasing the concentration of the monomer having a functional group, the content of the monomer having a functional group can be raised.

Since the thermoplastic resin to be used herein does not need to have a high mechanical strength after modified to a free functional group, its polymerization degree may be small.

The resulting slurry-like copolymer is eventually integrated to the electrode on which it is then hot-pressed at a high temperature. Therefore, the copolymer thus obtained needs only to be formed over a roller or the like into a sheet having a thickness as small as about 0.005 to 1 mm.

In general, an electrode is made of a catalyst for allowing the progress of electrode reaction as a fundamental function, an auxiliary component for assisting the progress of reaction (e.g., hydrophobic layer for transporting gas, co-catalyst), an electrically-conductive electrode substrate for transporting charged particles such as electron, etc. Referring to the electrode to be used herein, at least one of the anode (negative electrode of fuel cell) and the cathode (positive electrode of fuel cell) is preferably porous. The pores of such a porous electrode preferably has a diameter of from 10 nm to 0.1 mm. By heating and/or pressing the pair of electrodes with the foregoing thermoplastic resin membrane or ion exchange membrane interposed therebetween so that the assembly is under the application of external force to deform the thermoplastic resin membrane or ion exchange membrane. In this manner, the thermoplastic resin membrane or ion exchange membrane partly penetrates or is pressed into the pores of the porous electrode to form a three-dimensional interface. Thus, the electrode and the thermoplastic resin membrane or ion exchange membrane are integrated to each other to form an electrode-membrane assembly.

The pores of the electrode of the invention preferably acts to accelerate the transfer of the material and product. The electrode of the invention, if used in a fuel cell, is made of carbon-based material such as carbon fiber and carbon powder from the standpoint of chemical stability or production cost. The carbon-based material has an electrode material such as noble metal (e.g., platinum, platinum-ruthenium alloy) and oxide thereof supported on the porous inner wall which also acts a three-dimensional gas passage. A carbon powder, if used, is allowed to support an electrode material thereon, mixed with a binder such as fluororesin, and then calcined at a temperature of from 120° C. to 370° C. to obtain an electrode. The resulting electrode normally has pores having a diameter of from 10 nm to 500 nm formed therein through which the supply of the starting material gas and the recovery of the product are conducted. When a polymer solid electrolyte is used as the binder, the contact area can be increased, hopefully improving the performance of the fuel cell.

Both the electrodes are preferably grooved on the outer side thereof. A porous electrical supplier is provided on the electrodes. In this arrangement, the electrical supplier supplies electric current into the electrodes and supplies and discharges gas. In the case where the electrodes exhibit an insufficient strength, making it impossible to maintain smoothness and uniform connection, a current collector or reinforcing material may be interposed between the two electrodes in such a manner that the resulting voltage loss becomes minimum.

In the case where both the two electrodes are rigid, making it difficult for the ion exchange membrane or thermoplastic resin membrane to come in uniform contact with the entire inner surface thereof, a flexible electrode may be used. Alternatively, such a rigid electrode may be used in assembly with a flexible current collector. When the distance between the two electrodes is 0.01 mm, if suffices if the ion exchange membrane or thermoplastic resin membrane is flexible enough to be deformed by the amount of from about 0.005 mm to 0.02 mm. The electrical supplier or current collector may be made of a corrosion-resistant metal or alloy such as titanium and stainless steel. In spite of grooving the electrodes, a porous material having a mesh or looper formed therein may be used.

As the catalyst for the anode for the generation of oxygen in the case where the invention is used for ordinary electrolysis there is preferably used a metal such as iridium, platinum, ruthenium, tin and titanium or oxide thereof. As the catalyst for the ozone generating anode there may be used an electrically-conductive diamond, lead oxide or the like. These catalysts are supported on a metal gauze, sintered powder or sintered metal fiber made of a corrosion-resistant material such as titanium and tantalum by thermal decomposition method, resin fixing method, composite plating method or the like such that the catalyst concentration reaches from about 1 to 1,000 g/m$^2$. The thickness of the electrode is preferably from 0.1 mm to 5 mm. In this case, the anode electrical supplier is made of a metal such as titanium or alloy or oxide thereof. The electrical supplier preferably has a hydrophobic or hydrophilic material supported in dispersion thereon to facilitate the supply of reaction gas and solution and the removal of resulting gas and product.

The catalyst for the hydrogen generating cathode is preferably made of a metal such as platinum and ruthenium or oxide thereof. These catalysts are supported on a metal gauze, sintered powder or sintered metal fiber made of a corrosion-resistant material such as titanium and tantalum by thermal decomposition method, resin fixing method, composite plating method or the like such that the catalyst concentration reaches from about 1 to 1,000 g/m$^2$. The thickness of the electrode is preferably from 0.1 to 5 mm. In this case, the cathode electrical supplier is made of a metal such as titanium and stainless steel or alloy or oxide thereof. The electrical supplier preferably has a hydrophobic or hydrophilic material supported in dispersion thereon to facilitate the supply of reaction gas and solution and the removal of resulting gas and product.

The invention can be used as a gas diffusion electrode for industrial electrolysis such as oxygen gas cathode and hydrogen gas anode as follows.

In the case where the invention is used as an oxygen gas cathode, ordinary electrolysis may involve the use of platinum or silver as a catalyst, and as the catalyst for production of hydrogen peroxide there may be used platinum, graphite or gold. These catalysts may be formed into sheet as they are or may be supported on a plate, metal gauze, sintered powder or sintered metal fiber made of a corrosion-resistant material such as nickel, stainless steel, zirconium, silver and carbon by thermal decomposition method, resin fixing method, composite plating method or the like such that the catalyst concentration reaches from about 1 to 1,000 g/m$^2$. In this case, the cathode electrical supplier is made of a metal such as titanium and nickel or alloy or oxide thereof or carbon. The electrical supplier preferably has a hydrophobic or hydrophilic material supported in dispersion thereon to facilitate the supply of reaction gas and solution and the removal of resulting gas and product. By forming a hydrophobic sheet on the side of the cathode opposite the anode, the supply of gas onto the reaction surface can be controlled. The amount of oxygen to be supplied may be about the same as to twice the calculated value. As the oxygen to be supplied there may be used air or commercial oxygen bomb. Alternatively, there may be used oxygen produced by the electrolysis of water in a separately installed electrolytic cell. Further, oxygen obtained by concentrating air by PSA device may be used. In general, the higher the oxygen concentration is, the larger is the resulting current.

In the case where the invention is used as a hydrogen gas cathode, as the catalyst there is preferably used platinum or alloy thereof. These catalysts may be formed into sheet as they are or may be supported on a plate, metal gauze, sintered powder or sintered metal fiber made of a corrosion-resistant material such as titanium and carbon by thermal decomposition method, resin fixing method, composite plating method or the like such that the catalyst concentration reaches from about 1 to 1,000 g/m$^2$. In this case, the anode electrical supplier is made of titanium or carbon. The electrical supplier preferably has a hydrophobic or hydrophilic material supported in dispersion thereon to facilitate the supply of reaction gas and solution and the removal of resulting gas and product. By forming a hydrophobic sheet on the side of the anode opposite the cathode, the supply of gas onto the reaction surface can be controlled. The amount of oxygen to be supplied may be about the same as to twice the calculated value. As the hydrogen to be supplied there may be used hydrogen gas produced from natural gas or produced by the modification of petroleum. Hydrogen produced at the counter electrode can be used to reduce cost.

In order to assure the separation of reactant and product and the transportation of product, a gasket may be disposed around the electrode-membrane assembly. The thickness of the gasket is preferably from 0.01 mm to 10 mm. The material of the gasket may be selected depending on the working conditions, etc. For example, a fluorine-containing resin or rubber may be used.

The integration of the thermoplastic resin having a functional group and the electrode thus prepared can be accomplished as follows.

In some detail, a thermoplastic resin membrane which has previously been formed into a thin sheet is disposed interposed between two electrodes which are preferably both porous. The assembly is then heated to a temperature of from 200° C. to 300° C. to obtain a homogeneous membrane having a thickness of from 5 $\mu$m to 100 $\mu$m. If necessary, the assembly may be pressed to enhance the efficiency in formation. The electrodes normally have pores with a diameter of from 10 nm to 0.1 mm. When the assembly is heated or pressed at the integration step, the thermoplastic resin membrane is partly extruded into the pores of the electrodes to form a three-dimensional interface. In this manner, the electrodes and the thermoplastic resin membrane are bonded to each other to prepare an assembly.

The electrode-ion exchange membrane assembly thus obtained can be used for electrochemical purpose as it is. However, the electrode-thermoplastic resin membrane assembly thus obtained cannot be used as it is. Nevertheless, the latter assembly can be easily stored and handled. When subsequently subjected to modification, the latter assembly has a free ion exchange group produced therein and thus can be used for predetermined purposes. Accordingly, the foregoing electrode-thermoplastic resin membrane assembly can be used as a precursor which can be modified to have an ion exchange group.

The modification treatment can be properly conducted according to the kind of the functional group. The modification normally involve hydrolysis. For example, —$SO_2Na$ group is hydrolyzed to —$SO_3Na$ group. The hydrolysis is carried out by adding the compound to be hydrolyzed to a mixture of from 5 to 50% by weight of an organic solvent such as methanol and dimethyl sulfoxide and from 5 to 50% by weight of an aqueous solution of alkali hydroxide. This mixture can easily penetrate into the thermoplastic resin and thus can reduce the reaction time. However, it is likely that the thermoplastic resin can swell to destruction. In order to prevent this trouble, hydrolysis may be effected with an aqueous solution of alkali free of organic solvent. The foregoing —$SO_3Na$ group or other salt type functional group can be optionally processed with hydrochloric acid or sulfuric acid so that it is converted to a sulfonic acid group —$SO_3H$, and then washed with water to obtain an electrode-membrane assembly having an H type ion exchange group.

It is likely that the membrane can swell or shrink to destroy the assembly at the hydrolysis step or the like. Therefore, a thermoplastic resin membrane or ion exchange membrane having a reduced strength is preferably flexible enough to allow deformation by 10% to 20%.

Embodiments of the electrode-membrane assembly of the invention will be described hereinafter in connection with the attached drawings, but the present invention should not be construed as being limited thereto.

Figure 2:
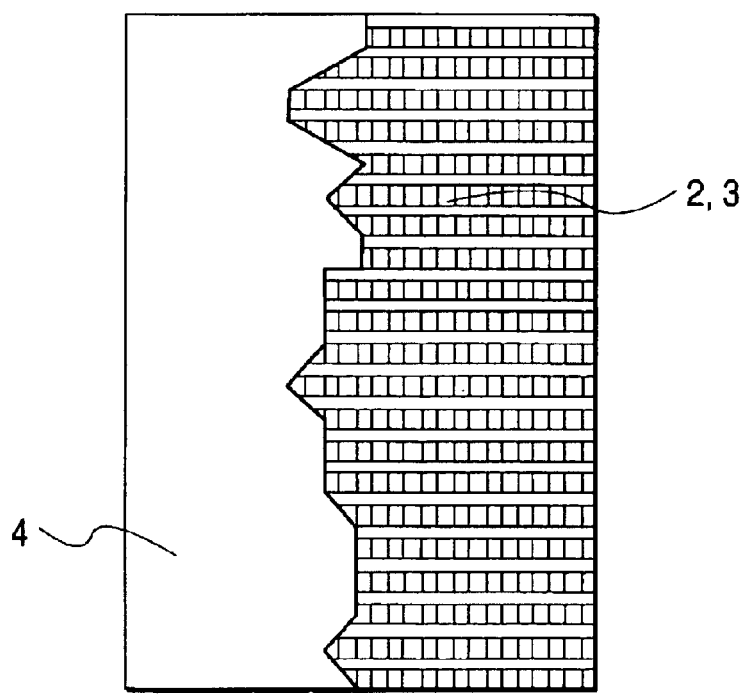
FIG. 2 is a partially cutaway side view of the electrode-membrane assembly of FIG. 1, wherein the reference numeral 1 indicates an electrode-membrane assembly, the reference numeral 2 indicates a porous hydrogen gas anode, the reference numeral 3 indicates a porous oxygen gas cathode, the reference numeral 4 indicates an ion exchange membrane, the reference numeral 5 indicates an anode gasket, the reference numeral 6 indicates an anode current supplier, the reference numeral 9 indicates an anode chamber frame, the reference numeral 10 indicates a cathode gasket, the reference numeral 11 indicates a cathode current supplier, and the reference numeral 14 indicates a cathode chamber frame.

FIG. 1 is an exploded front view illustrating an embodiment of the fuel cell having an electrode-membrane assembly of the invention incorporated therein. FIG. 2 is a partially cutaway side view of the electrode-membrane assembly of FIG. 1.

The electrode-membrane assembly 1 according to the present embodiment comprises a polymer electrolyte membrane 4 disposed interposed between a pair of porous electrodes, i.e., porous hydrogen electrode 2 and porous oxygen electrode 3. The polymer electrolyte membrane 4 has been pressed into the pores of the hydrogen electrode 2 and the oxygen electrode 3 on the both sides thereof. In this manner, the polymer electrolyte membrane 4 has been deformed so that the polymer electrolyte membrane 4 and the electrodes 2 and 3 are firmly bonded to each other (These members are not shown bonded to each other in FIG. 1 to make clear the positional relationship therebetween). The polymer electrolyte membrane 4 is made of a thermoplastic resin which has a functional group before assembly. Since the thermoplastic resin is flexible, it penetrates or is pressed into the pores of the porous electrodes 2 and 3 so that the electrodes and the thermoplastic resin are firmly bonded to each other. When the assembly thus formed is then subjected to hydrolysis, the thermoplastic resin component is converted to an ion exchange membrane while kept bonded to the electrodes to give a fuel cell.

The hydrogen electrode 2 has a hydrogen electrode current collector 6 fitted in a frame-shaped anode gasket 5 disposed in contact with the outer surface thereof. The hydrogen electrode current collector 6 is kept in contact with the polymer electrolyte membrane 4 under pressure by the hydrogen electrode chamber frame (electrical supplier) 9 having an oxygen supply port 7 and an electrolyte outlet 8.

The oxygen electrode 3 has an oxygen electrode current collector 11 fitted in a frame-shaped oxygen electrode gasket 10 disposed in contact with the outer surface thereof. The oxygen electrode current collector 11 is kept in contact with the polymer electrolyte membrane 4 under pressure by the oxygen electrode chamber frame (electrical supplier) 14 having a hydrogen supply port 12 and an electrolyte outlet 13.

The fuel cell thus arranged can produce a great current because it comprises a polymer electrolyte membrane having a high ion exchange capacity and thus realizes a high performance cell. In general, an ion exchange membrane having a high ion exchange capacity exhibits a reduced mechanical strength and thus often cannot be used for industrial operation. In the fuel cell according to the present embodiment, however, the polymer electrolyte membrane partly penetrates or is pressed into the pores of the porous electrode so that the electrodes and the polymer electrolyte membrane are integrated to each other to compensate for the insufficiency of the mechanical strength of the polymer electrolyte membrane. Thus, the fuel cell according to the present embodiment can be used for industrial operation.

While the electrode-membrane assembly has been described for fuel cell in the present embodiment, the electrode-membrane assembly of the invention can be used in an industrial electrolytic cell for salt electrolysis, etc.

Examples and comparative examples of the electrode-membrane assembly according to the invention and the process for the preparation thereof will be described hereinafter, but the invention is not limited thereto.

EXAMPLE 1

In an autoclave, a perfluorovinyl ether [$CF_2=CF-(OCF_2CFCF_3)-O-(CF_2)_2SO_2F$] monomer having a protected functional group was dissolved in 1,1,2-trichloro-1,2,2-trifluoroethane as a diluent to make a 40 wt % solution. To the solution was then added a radical reaction initiator. While TFE gas was pressed into the autoclave at a pressure of 2 kgf/cm², the reaction solution was then heated to a temperature of 40° C. so that the monomer and TFE gas were allowed to polymerization to obtain a copolymer.

The copolymer thus obtained exhibited an exchange capacity of 1.4 milliequivalents/g of dried resin. The resin powder thus produced was then formed over a 280° C. hot roller into a sheet having a thickness as small as about 0.05 mm to obtain a precursor (thermoplastic resin) of solid polymer electrolyte.

Subsequently, an iridium oxide catalyst powder was dissolved in an alcohol solvent having a fluororesin suspended therein to prepare a paste. The paste thus prepared was fixed to a (porous) sintered titanium fiber by heat treatment to obtain an anode.

A sheet having a platinum-on-carbon powder fixed to a fluororesin was fixed to a (porous) sintered zirconium fiber having a thickness of 0.5 mm by heat treatment to a density of 100 g/m² to obtain a cathode. The cathode thus obtained exhibited an electrode area of 20 cm².

The polymer solid electrolyte precursor was interposed between the porous anode and the porous cathode. The assembly thus obtained was then heated to a temperature of 280° C. under a low pressure to obtain a homogeneous assembly having a finished polymer solid electrolyte thickness of about 30 μm. In this manner, at least a part of the precursor resin component was allowed to penetrate into the pores of the porous electrode or pressed into these pores to effectively form a three-dimensional interface. When observed on its section, the assembly thus obtained was observed to have a good electrode-polymer solid electrolyte precursor interface.

The assembly thus obtained was then dipped in a mixture of 50% by weight of methanol as an organic solvent and 50% by weight of sodium hydroxide so that it was subjected to hydrolysis. Subsequently, the assembly thus hydrolyzed was dipped in a 20 wt % aqueous solution of hydrochloric acid so that it was rendered sulfonic. The assembly was then thoroughly washed with water.

The assembly thus treated was mounted in a titanium electrode chamber provided with a 3 mm pitch groove which acts as an electrical supplier with a bolt and a nut such that the face pressure reached 5 kgf/cm² to give a cell assembly.

Purified water was then supplied into the anode chamber at a rate of 20 ml and a temperature of 80° C. while a current of 20 A was flowing therethrough. As a result, the cell voltage was 1.6 V. The cathode chamber and the anode chamber outputted an oxygen gas having a purity of 99.9% and a hydrogen gas having a purity of 99.99%, respectively, at a current efficiency of 97%.

Comparative Example 1

The copolymer obtained in Example 1 was formed into a sheet having a thickness as small as about 0.05 mm which was then subjected to hydrolysis in the same manner as in Example 1. The sheet thus hydrolyzed exhibits an insufficient mechanical strength and thus could not form a filmy material by itself.

EXAMPLE 2

A particulate furnace black carbon having platinum (which acts as an oxygen reduction electrode) supported thereon and a particulate furnace black carbon having a platinum-ruthenium alloy (which acts as a hydrogen oxidation electrode) supported thereon were used as an electrode material. The two electrode materials were each mixed with a fluororesin and naphtha. The mixtures were each washed with acetone, dried, and then calcined on a porous substrate made of carbon fiber at a temperature of 130° C. to prepare a cathode and an anode each having a catalyst supported thereon in an amount of 100 g/m², respectively.

The polymer solid electrolyte precursor obtained in Example 1 was disposed interposed between the two electrodes. The assembly thus obtained was then heated to a temperature of 280° C. under a low pressure to obtain a homogeneous assembly having a finished polymer solid electrolyte thickness of about 30 μm. In this manner, at least a part of the precursor resin component was allowed to penetrate into the pores of the porous electrode or pressed into these pores to effectively form a three-dimensional interface. When observed on its section, the assembly thus obtained was observed to have a good electrode-polymer solid electrolyte precursor interface.

The assembly thus obtained was then dipped in a 20 wt-% aqueous solution of sodium hydroxide so that it was subjected to hydrolysis. Subsequently, the assembly thus hydrolyzed was dipped in a 20 wt % aqueous solution of hydrochloric acid so that it was rendered sulfonic. The assembly thus treated was then thoroughly washed water.

A foamed nickel was then mounted on the other side of the electrodes in the assembly as a current collector. The assembly was then mounted in a titanium electrode chamber provided with a groove as in Example 1 with a bolt and a nut such that the face pressure reached 5 kgf/cm² to give a cell assembly.

The relationship between voltage and current was measured while hydrogen and oxygen were being supplied into the various chambers, respectively, at a rate of 10 ml per minute at a temperature of 90° C. As a result, the cell voltage was 0.8 V at a current of 20 A.

EXAMPLE 3

A copolymer was prepared in the same manner as in Example 1 except that the reaction solution was heated to a temperature of 45° C. while TEF gas was pressed into the autoclave at a pressure of 4 kgf/cm².

The copolymer thus obtained exhibited an exchange capacity of 1.2 milliequivalents/g of dried resin. The resin powder thus produced was then formed over a 280° C. hot roller into a sheet having a thickness as small as about 0.01 mm to obtain a precursor (thermoplastic resin) of solid polymer electrolyte.

The polymer solid electrolyte precursor thus obtained was processed in the same manner as in Example 2, and then assembled to a fuel cell. Using this fuel, the relationship between voltage and current was then measured. As a result, the cell voltage was 0.75 V at a current of 20 A.

Comparative Example 2

A polymer solid electrolyte was previously prepared in the same manner as in Example 3 except that hydrolysis, sulfonic modification and rinsing were effected in the same manner as in Example 1.

The polymer solid electrolyte and the electrode and electrical supplier of Example 2 were then assembled to a cell.

The relationship between voltage and current was measured while hydrogen and oxygen were being supplied into the various chambers, respectively, at a rate of 10 ml per minute at a temperature of 90° C. As a result, the cell voltage was 0.7 V at a current of 20 A.

The first assembly of the invention is an electrode-membrane assembly comprising a pair of electrodes at least one of which is porous and a thermoplastic resin membrane having a functional group capable of being modified to a free ion exchange group upon hydrolysis, which is interposed between the two electrodes and partly penetrates into the pores of the electrode.

Since this electrode-membrane assembly has a functional group which is not free, it cannot be used for electrochemical purpose as it is. In order to use this electrode-membrane assembly for electrochemical purpose, it is necessary that the electrode-membrane assembly be subjected to modification to allow the functional group to be released. This electrode-membrane assembly can be easily stored and handled. Accordingly, the electrode-thermoplastic resin membrane assembly can be used as a precursor which can be modified to have an ion exchange group.

As the thermoplastic resin to be incorporated in the electrode-membrane assembly there may be used a fluorine-containing ion exchange resin having a functional group which can be modified to a sulfonic acid group or a copolymer of tetrafluoroethylene and a fluorovinyl compound having sulfonyl fluoride as a functional group.

As the thermoplastic resin there may also be used a copolymer of tetrafluroethylene and a fluorovinyl compound which is a precursor of a fluorine-containing ion exchange resin having a phosphonic acid group.

Another assembly of the invention is an electrode-membrane assembly comprising a pair of electrodes at least one of which is porous and an ion exchange membrane having a free ion exchange group which is interposed between the two electrodes and partly penetrates into the pores of the electrode.

In this assembly, even if an ion exchange membrane having a relatively small mechanical strength the polymerization degree of which has been lowered or the ion exchange group concentration of which has been raised to raise the ion exchange capacity is used, the ion exchange membrane partly penetrates into the pores of the electrodes so that the two members are firmly bonded to each other. In this arrangement, the insufficiency of the mechanical strength of the ion exchange membrane can be compensated for by the electrodes, eliminating the disadvantages of the related art.

Thus, the electrode-membrane assembly of the invention can comprise an ion exchange membrane having a high ion exchange capacity in such an arrangement that the insufficiency of the mechanical strength thereof can be compensated for. Accordingly, the electrode-membrane assembly of the invention can be used as a high performance electrode for fuel cell or zero-gap type electrolytic cell.

The process of the invention is a process for the preparation of an electrode-membrane assembly which comprises disposing a thermoplastic resin membrane having a functional group capable of being modified to a free ion exchange group upon hydrolysis interposed between a pair of electrodes at least one of which is porous, applying an external force to the assembly so that the thermoplastic resin membrane is deformed and partly allowed to penetrate into the pores of the porous electrode to make integration, and then subjecting the assembly to hydrolysis so that the functional group is released and modified to a free ion exchange group.

In accordance with the process of the invention, the formation of the thermoplastic resin and the integration of the thermoplastic resin to the electrodes can be made while the functional group is being protected and a good elastic deformation is being made possible. In this manner, the electrodes and the thermoplastic resin membrane can be firmly bonded to each other. Thereafter, the functional group in the thermoplastic resin is modified. Accordingly, an electrode-membrane assembly excellent both in mechanical strength and ion exchange capacity can be provided without having any adverse effect on the connection of the ion exchange membrane thus modified to the electrodes.

While the invention has been described in detail and with reference to specific embodiments thereof, it will be apparent to one skilled in the art that various changes and modifications can be made therein without departing from the spirit and scope thereof.

What is claimed is:

1. An electrode-membrane assembly comprising a pair of electrodes at least one of which is a porous electrode, and a thermoplastic resin membrane having a functional group capable of being modified to a free ion exchange group upon hydrolysis, which is interposed between said two electrodes and partly penetrates into the pores of said at least one porous electrode.

2. The electrode-membrane assembly as claimed in claim 1, wherein said thermoplastic resin acts as a precursor of a fluorine-containing ion exchange membrane having a sulfonic acid group.

3. The electrode-membrane assembly as claimed in claim 1, wherein said thermoplastic resin membrane acts as a precursor of a fluorine-containing ion exchange membrane having a phosphonic acid group.

4. The electrode-membrane assembly as claimed in claim 1, wherein said thermoplastic resin is a copolymer of tetrafluoroethylene and a fluorovinyl compound having sulfonyl fluoride as a functional group.

5. An electrode-membrane assembly comprising a pair of electrodes at least one of which is a porous electrode, and an ion exchange membrane having a free ion exchange group, which is interposed between said two electrodes and partly penetrates into the pores of said at least one porous electrode.

6. A fuel cell comprising an electrode-membrane assembly as claimed in claim 5.

7. A zero-gap type electrolytic cell comprising an electrode-membrane assembly, said electrode-membrane assembly comprising a pair of electrodes at least one of which is a porous electrode, and an ion exchange membrane having a free ion exchange group, which is interposed between said two electrodes and partly penetrates into the pores of said at least one porous electrode.

8. A process for the preparation of an electrode-membrane assembly comprising a pair of electrodes at least one of which is a porous electrode, and a thermoplastic resin membrane having a functional group capable of being modified to a free ion exchange group upon hydrolysis, which is interposed between said two electrodes and partly penetrates into the pores of said at least one porous electrode, which process comprises interposing a thermoplastic resin membrane having a functional group capable of being modified to a free ion exchange group upon hydrolysis between a pair of electrodes at least one of which is a porous electrode, applying an external force to the assembly so that said thermoplastic resin membrane is deformed and partly allowed to penetrate into the pores of said at least one porous electrode to make integration, and then subjecting the assembly to hydrolysis so that said functional group is released and modified to a free ion exchange group.

* * * * *